United States Patent [19]

Noguchi et al.

[11] Patent Number: 5,016,133
[45] Date of Patent: May 14, 1991

[54] APPARATUS FOR FLICKER PROTECTION WHEN A SERVO-MOTOR STARTS

[75] Inventors: Minetoshi Noguchi, Tama; Shigemi Yamano, Chofu, both of Japan

[73] Assignee: Juki Corporation, Tokyo, Japan

[21] Appl. No.: 512,062

[22] Filed: Apr. 18, 1990

Related U.S. Application Data

[63] Continuation of Ser. No. 149,697, Jan. 29, 1988, abandoned.

[30] Foreign Application Priority Data

Jan. 30, 1987 [JP]   Japan ................................. 62-21110

[51] Int. Cl.$^5$ .............................................. H02H 3/24
[52] U.S. Cl. ........................................ 361/92; 361/86; 318/458; 318/611; 388/833; 112/271
[58] Field of Search ............................. 361/86, 88, 92; 318/268, 270, 271, 276, 278, 458, 611; 388/833; 340/660, 661; 112/271

[56] References Cited

U.S. PATENT DOCUMENTS

| | | | |
|---|---|---|---|
| 4,323,833 | 4/1982 | Watanabe et al. | 318/376 |
| 4,388,572 | 6/1983 | Rosenfeldt | 318/317 |
| 4,456,859 | 6/1984 | Watanabe et al. | 318/313 |
| 4,527,496 | 7/1985 | Kemmel | 112/279 |

FOREIGN PATENT DOCUMENTS

| | | |
|---|---|---|
| 57-95196 | 6/1982 | Japan . |
| 57-183289 | 11/1982 | Japan . |
| 59-156379 | 9/1984 | Japan . |
| 59-46624 | 11/1984 | Japan . |

*Primary Examiner*—Derek S. Jennings
*Attorney, Agent, or Firm*—Morgan & Finnegan

[57] ABSTRACT

An apparatus for flicker protection when a servo motor driven sewing machine starts utilizing comparators. Setting the original voltage as the reference voltage and the dropped voltage as the monitor voltage, the comparator compares the voltages and, if the difference exceeded more than the predetermined value, signals for setting the maximum electric current to the servo motor are attenuated such that the voltage drop of the electric source will be reduced.

3 Claims, 3 Drawing Sheets

APPARATUS FOR FLICKER PROTECTION WHEN A SERVO-MOTOR STARTS

This is a continuation of co-pending application Ser. No. 07/149,697, filed on Jan. 29, 1988.

BACKGROUND OF THE INVENTION

This invention relates to apparatus for protection of, for example, an electric light from flicker due to voltage drop when a servo motor starts and, more particularly, this invention is applicable to a servo motor driven sewing machine installed in a household where its power supply is limited.

It has been found that, to increase sewing efficiency, sewing machine operators used to pedal down the sewing machine foot switch so quickly to rotate the servo motor at high speed that the electric voltage at the sewing factory was suddenly dropped and caused what is called "flicker". To alleviate this problem, an apparatus for protection of flicker when a servo motor starts has been suggested as shown at FIG. 3.

Referring to FIG. 3, AC current source 1 is connected to rectifier 2 and resistances 3, 4. Other resistances 5, 6, which branch from the connection of resistances 3, 4 and a condenser 7 in parallel with resistance 6 are arranged as shown. These parts constitute a reference-voltage-setting circuit. Resistances 8, 9 and variable resistance 10 are arranged as shown and these parts constitute a comparative-voltage-setting circuit. A servo motor 11, collector and emitter of the transistor 12, and resistance 13 are arranged in series as shown. The resistance 13 is used for detecting electric current The connection of the resistances 5, 6 is input to the minus terminal of the first comparator 14.

The output from the variable resistance 10 is connected to the plus terminal of the first comparator 14. A feedback resistance 15 is connected to the first comparator 14. Resistances 16, 17 in series with electric source $V_{cc}$ constitute a electric-current-setting circuit. Voltage at the connection of the resistance 16 and the resistance 17 is connected to the plus terminal of the second comparator 18 and to the plus terminal of a third comparator 19. The emitter of the transistor 12 and the resistance 13 are connected to the minus terminal of the second comparator 18. The minus terminal of the third comparator 19 is connected to output of the first comparator 14.

The output from the comparator 19 is connected to a control circuit 20. The output from the control circuit 20 is connected to the base of the transistor 12. A pedal 21 is connected to the control circuit 20.

In the suggested arrangement, when an operator pushes pedal 21, since the output from the second comparator 18 is high, control current from the control circuit 20 flows to the base of the transistor 12. The circuit between the collector and the emitter closes, electric current flows to the servo motor 11, and the servo motor 11 starts rotation. At this moment, the electric current to the servo motor 11 flows to the resistance 13 which is used to detect the electric current.

To insure that this electric current is less than a set current level, for instance 20A, the voltage at the resistance 13 is connected to minus terminal of the second comparator 18 such that the electric current at the resistance 13 will be kept less than 20A. To do so, output from the second comparator 18 is maintained low.

On the other hand, when the electric current flows to the servo motor 11, output from the variable resistance 10 becomes low, so the plus side voltage of the servo motor 11 drops. Resultantly, the output from the first comparator 14 becomes low, the output from the third comparator 19 becomes high, and thus electric current to the servo motor 11 is stopped.

According to the aforementioned suggested arrangement, when the servo motor 11 starts and comparatively large electric current flows, the electric voltage drops and shuts out the electric current from the control circuit 20. Accordingly, the servo motor 11 acts intermittently, the motor, pulley, and belt vibrate simultaneously, and therefore the machine as a whole vibrates. When an operator pushes the pedal 21 strongly, the electric current to the servo motor 11 becomes low, its rotation speed is lowered, and the sewing efficiency is lowered.

SUMMARY OF THE INVENTION

With the foregoing in mind, it is therefore an object of the invention to provide new and improved apparatus for flicker protection when a servo motor starts.

According to this invention, an apparatus for protection of flicker when a servo motor starts comprises a comparator circuit which compares a monitor voltage with a reference voltage connected to an electric source, an electric current setting setting circuit which sets the electric current to the servo motor to be a predetermined maximum value, a control circuit which supplies maximum electric current to the servo motor when a pedal signal is at maximum with reference to the signal from the electric current setting circuit and, when the monitor input becomes smaller than the reference voltage, the maximum-current-setting signal from the electric-current-setting circuit is attenuated with reference to the output signal from the electric-current-setting circuit. Thus, the voltage drop of the electric source when the servo motor starts is reduced.

According to this invention, when the voltage of the comparative-voltage-setting circuit is lower than the voltage of the reference-voltage-setting circuit, the low output from the first comparator is connected to the electric-current-setting circuit via a resistance and the attenuated signal by this resistance is input from the second comparator to the third comparator and then to the control circuit such that the servo motor is driven at the predetermined low current. Additionally, the maximum electric current flows to the servo motor on starting, so the rise time is not delayed.

Thus, during a voltage drop of the electric source, the motor will be run with low current and the servo motor is prevented from intermittent action and belt vibration and gear noise resulting from intermittent running of the servo motor are prevented.

BRIEF DESCRIPTION OF THE DRAWINGS

The accompanying drawings, referred to herein and constituting a part hereof, illustrate preferred embodiments of the invention and, together with the description, serve to explain the of the invention, wherein:

FIG. 8 is an electric circuit diagram for the prevention of flicker when a servo motor starts.

DETAILED DESCRIPTION OF THE DRAWINGS

Figure 1:
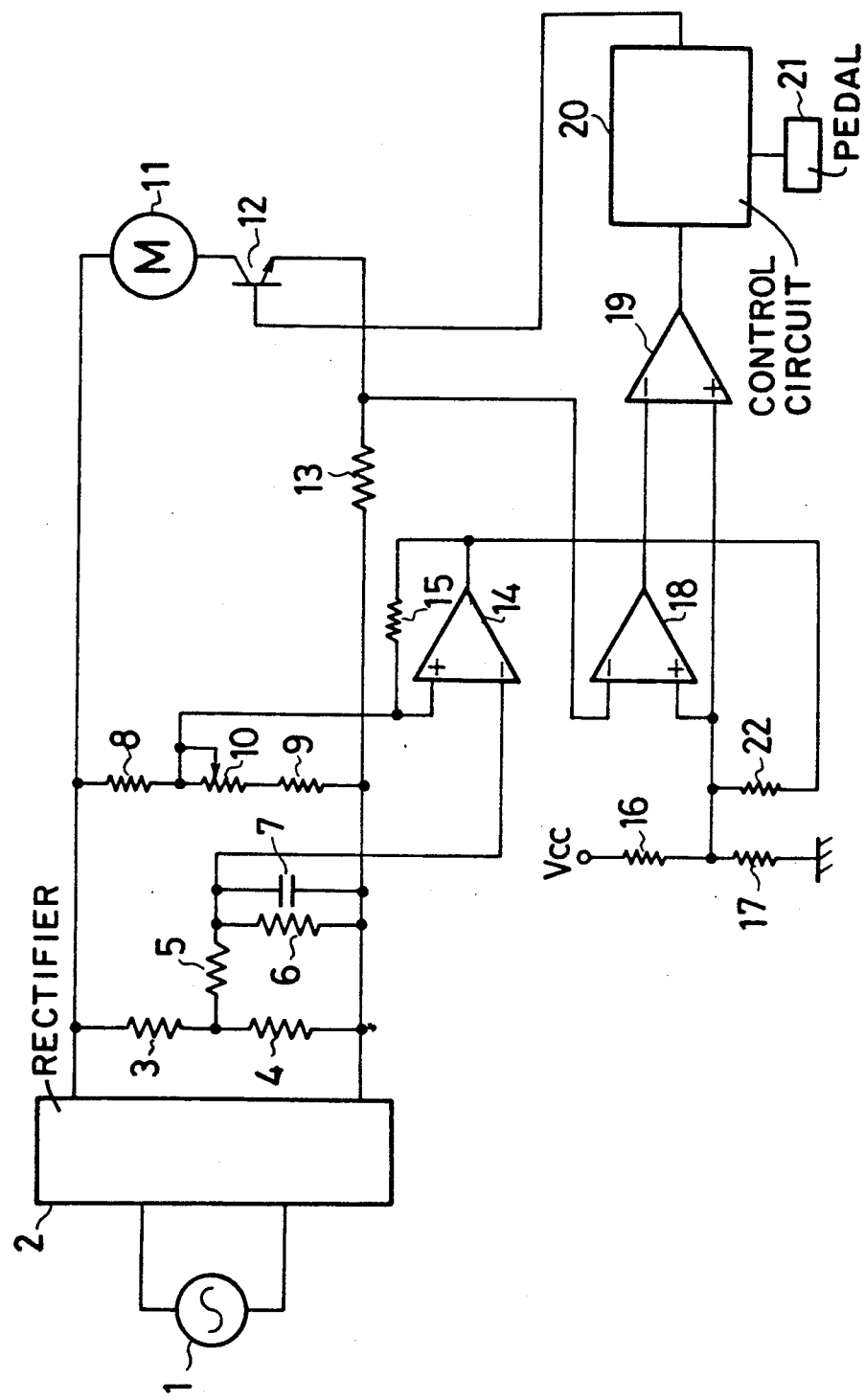
FIG. 1 is an electric circuit diagram for the prevention of flicker when a servo motor is started according to one embodiment of this invention.

Referring to FIG. 1, one preferred embodiment according to this invention will be explained. Numeral 1 denotes an alternating current electric source, numeral 2 denotes a rectifier, numerals 3,4,5,6 denote resistances, numeral 7 denotes a condenser, numerals 8,9 denote resistances, numeral 10 denotes a variable resistance, numeral 11 denotes a servo motor, numeral 12 denotes a transistor, numeral 13 denotes a resistance for detecting electric current, and numeral 14 denotes a first comparator.

Numeral 15 denotes a feedback resistance for hysteresis, numerals 16, 17 denote resistances for setting the electric current, numeral 18 denotes a second comparator, numeral 19 denotes a third comparator, numeral 20 denotes a control circuit, and numeral 21 denotes a pedal. The construction of this invention is similar to the suggested apparatus, so further explanation is unneccessary.

Comparing the instant invention with the suggested apparatus, one significant difference is that the output from the first comparator 14 is not connected to the output side of second comparator 18 but to the connection between the resistance 16 and the resistance 17 through a resistance 22.

According to this invention, when the maximum electric current flows to servo motor 11, the voltage at the plus side of the servo motor 11 drops and, resultantly, the output from the first comparator 14 becomes low. This low output causes the set voltage defined by the resistances 16, 17 to be lower than the predetermined value.

Accordingly, when the maximum electric current flows, the servo motor 11 will start with the predetermined low current, so gear noise caused by the intermittent running of the servo motor is prevented. When the load is increased, the maximum current will flow instantly, so the rise time will not be delayed.

Figure 2:
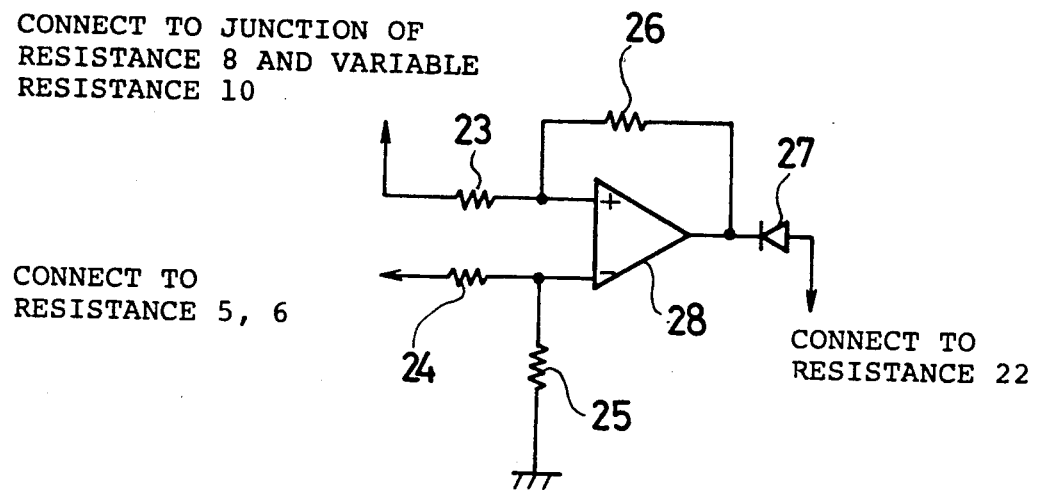
FIG. 2 is a diagram for another embodiment of this invention.
Figure 3:
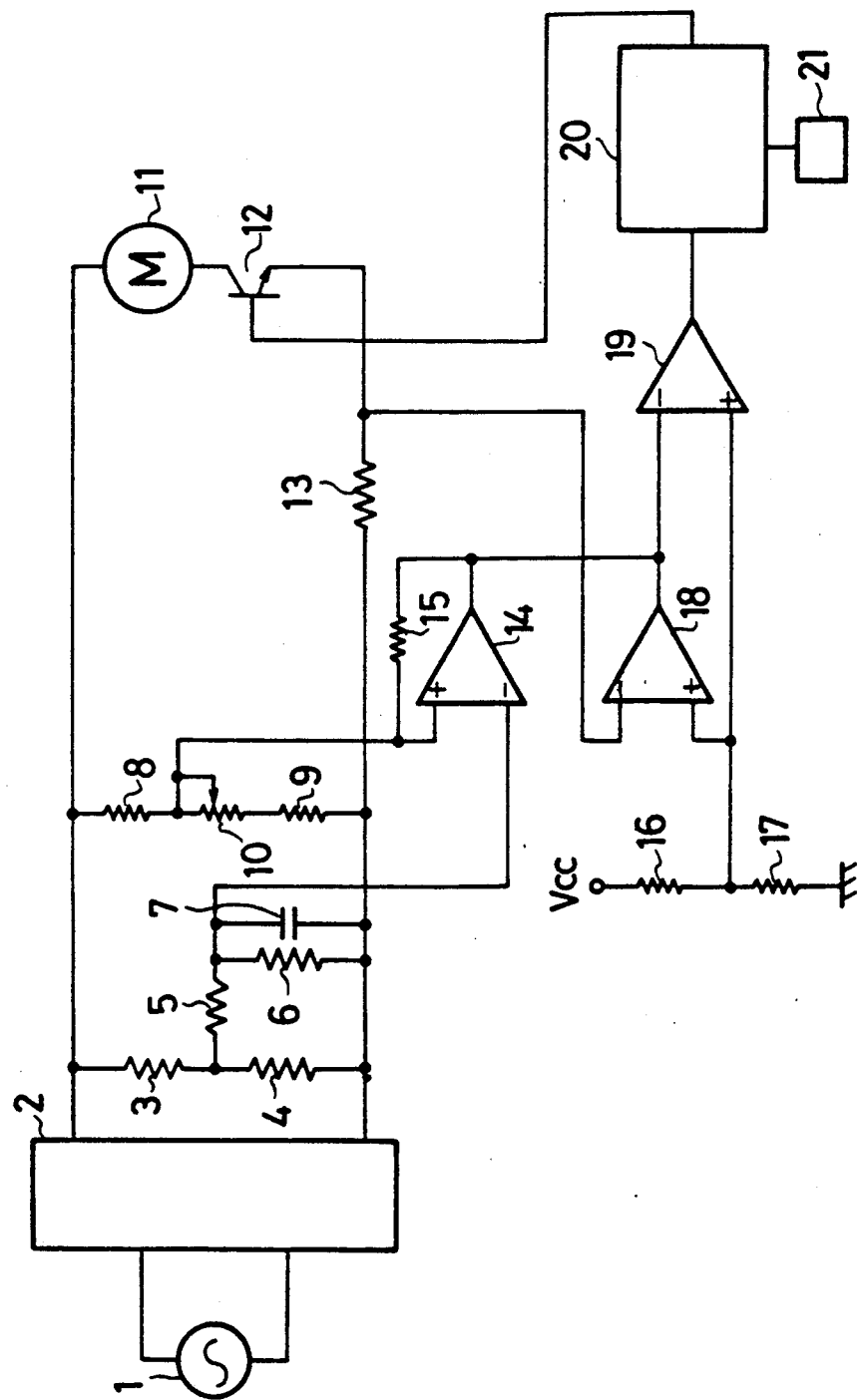

In this embodiment, the first comparator 14 is arranged as shown in FIG. 1, but the first comparator 14 can be substituted by a differential operation circuit 28 connecting resistances 23, 24, 25, 26 and a diode 27 as shown in FIG. 2. As aforementioned, according to this invention, when the voltage of the comparative-voltage-setting circuit is smaller than the voltage of the reference-voltage-setting circuit, the low output from the first comparator is input to the electric-current-setting circuit via a resistance.

Thus, signals attenuated by this resistance are input from the second comparator to the third comparator and then to the control circuit. Thereby, the servo motor will start with the predetermined low electric current, so the maximum electric current flows when the servo motor starts, the rise time is reduced, and intermittent running and gear noise due to the intermittent running are prevented.

As many apparently widely different embodiments of the invention may be made without departing the spirit and scope thereof, it is to be understood that invention is not limited to the specific embodiments thereof except as defined in the appended claims.

What is claimed:

1. In a sewing machine having a servo motor connected to an electric source for driving a main shaft of the sewing machine and a pedal switch for varying an electric current to drive or stop the servo motor in response to the amount of depression thereof, an electric circuit for reducing flicker due to voltage drop of said electric source when the servo motor starts, comprising:
    means for generating a signal representing a drop in voltage of said electric source,
    an electric-current-setting circuit for generating a signal representing a predetermined maximum current value for the servo motor,
    a control circuit for supplying an electric current in response to the amount of depression of said pedal switch such that when the depression amount is maximum, said predetermined maximum current is supplied to said servo motor, and
    an attenuating circuit responsive of said signal representing said drop in voltage for changing said signal representing said predetermined maximum current into a signal representing the reduced maximum current to said control circuit.

2. An electric circuit for reducing flicker according to claim 1, wherein said means for generating a signal representing a drop in voltage of said current source further comprises:
    a reference voltage generating circuit connected to said voltage source for generating a reference voltage with constant value,
    a comparative voltage generating circuit for generating a comparative voltage with value varying in accordance with the volume of an electric current supplied to said servo motor, and
    a comparator circuit for comparing said reference voltage and said comparative voltage.

3. An electric circuit for reducing flicker according to claim 1, wherein said attenuating circuit is connected to said electric-current-setting circuit and changes said signal representing said predetermined maximum current into a signal representing a reduced maximum current responsive to said signal representing said drop in voltage.

* * * * *